June 30, 1970     C. E. ANDERSON ET AL     3,517,512
APPARATUS FOR SUPPRESSING CONTRAILS Original Filed Nov. 13, 1962     2 Sheets-Sheet 1

INVENTORS
CHARLES E. ANDERSON,
SEYMOUR J. BIRSTEIN &
BERNARD A. SILVERMAN
BY
Harry A. Herbert Jr. and
Arsen Tashjian
ATTORNEYS

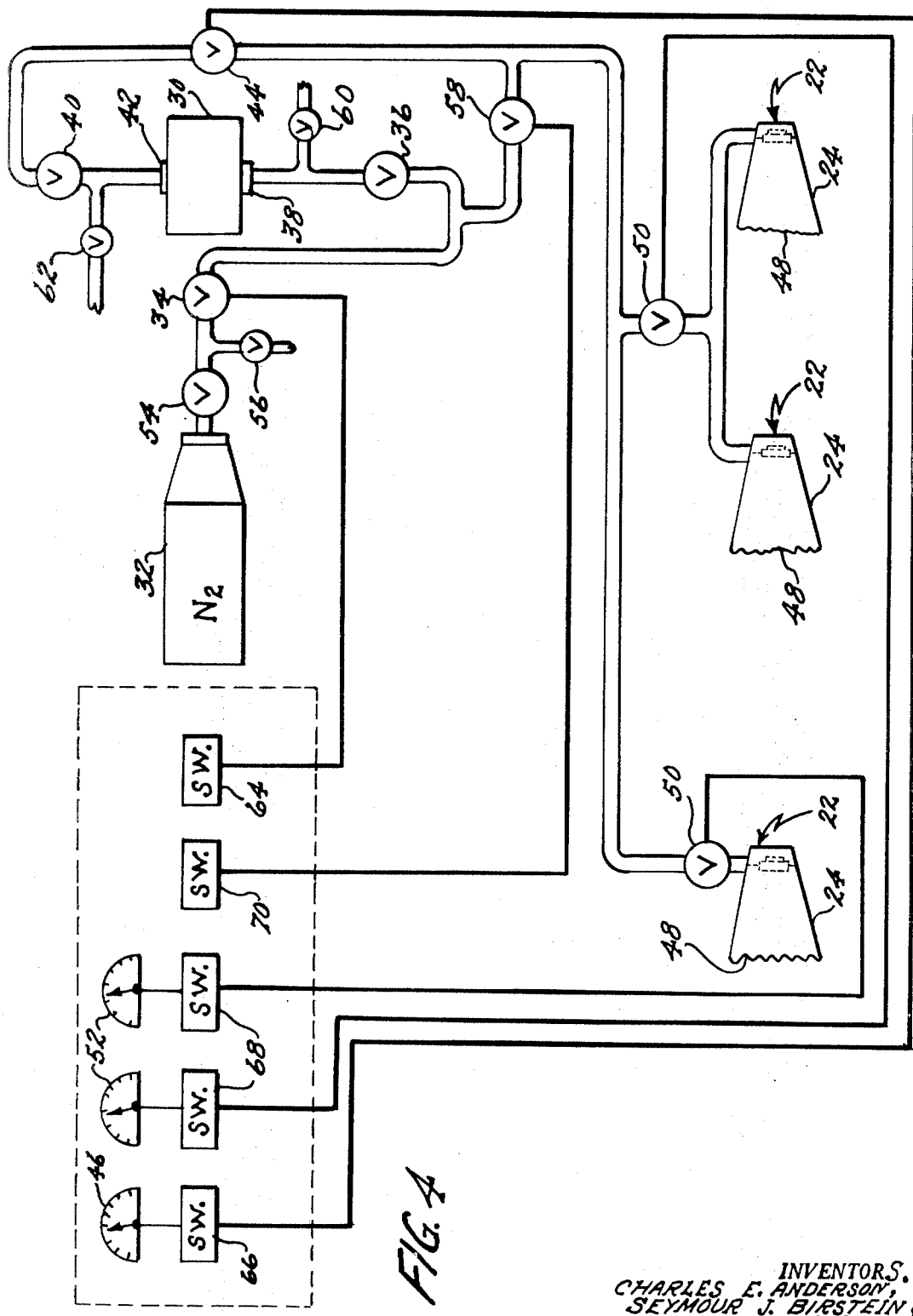

United States Patent Office 3,517,512
Patented June 30, 1970

3,517,512
APPARATUS FOR SUPPRESSING CONTRAILS
Charles E. Anderson and Seymour J. Birstein, Sudbury, and Bernard A. Silverman, Natick, Mass., assignors to the United States of America as represented by the Secretary of the Air Force
Original application Nov. 13, 1962, Ser. No. 237,406. Divided and this application Feb. 2, 1965, Ser. No. 429,929
Int. Cl. F02k 3/04
U.S. Cl. 60—264    2 Claims The invention described herein may be manufactured and used by or for the United States Government for governmental purposes without payment to us of any royalty thereon. This is a division of application Ser. No. 237,406, filed Nov. 13, 1962.

This invention relates to an apparatus for controlling the visibility of condensation water vapor produced during the combustion process of an aircraft jet engine under certain atmospheric and altitude conditions. The invention is more particularly concerned with providing apparatus for suppressing or eliminating the jet aircraft condensation trail by the redistribution of the liquid water present in the aircraft exhaust stream.

Vapor trails are the result of the condensation of water vapor exhausted by aircraft engines. During the combustion process, ordinary jet fuel forms about one and one-quarter pounds of water for each pound of fuel burned. For example, an engine burning 2000 pounds of fuel per hour would leave in its wake approximately five pounds of water per mile at an air speed of 500 miles per hour. Thus, it can be seen that a significant amount of water is available for contrail formation and is introduced into the atmosphere by the passage of the aircraft.

The condensation trail is visible by virtue of the light scattered by the trail constituents in the direction of the observer. Therefore, the luminance of the trail depends on both the light scattering properties of the particles in the trail and the intensity and direction of the incident light. Since the scattering from a volume of the trail depends on the size, shape, and space distribution of the trail constituents, the contrail becomes visible to a human observer if the luminance contrast exceeds a predetermined threshold value.

In dealing with the problem of reducing the visibility of condensation trails, there are two avenues of approach. Since contrails are essentially ice particles formed from the water produced through the burning of a hydrocarbon fuel, one approach would be to utilize a fuel which contains less hydrogen and therefore produces less water as a product of combustion. However, this approach raises additional problems of engine modification and fuel hose deterioration requiring replacement and redesign before the low hydrogen fuels can be efficiently utilized for flights of long duration. The other approach to the problem is to alter the size of the ice particles thereby reducing the visibility of the trail. This may be accomplished by reduction of the particle size below the visible range which has been found to be on the order of 0.5 micron. Crystals below this size appear as a blue haze rather than a white trail. From any distance this blue haze would be substantially invisible because of the lack of contrast with the atmosphere.

Accordingly, it is an object of the present invention to provide apparatus for suppressing the condensation trail of a jet aircraft by reducing the visibility of the ice particles formed by the introduction of water into the atmosphere.

Another object of the invention is to provide a technique for eliminating contrails by reducing the size of the trail particles below the visible range.

A further object of the invention is to prevent the formation of a jet engine contrail by introducing a nucleating substance into the aircraft exhaust stream thereby producing smaller, less visible particles rather than the larger visible particles which would ordinarily be produced as a product of combustion of the jet fuel.

A still further object of the invention is to inject a material which produces many small hygroscopic particles into a jet engine exhaust stream thereby providing nuclei upon which the water produced by the burning of jet fuel is made to condense. These nuclei form a larger number of condensed water particles of insufficient size to be visible under ordinary circumstances.

These and other objects, features, and advantages, including the greatly improved tactical capabilities of aircraft having little or no visible contrail, will become more apparent from the following description taken in conjunction with the accompanying drawings, wherein:

FIG. 4 is a schematic view of the generator and injector arrangement for supplying the nucleating agent to the jet engine exhaust.

Figure 1:
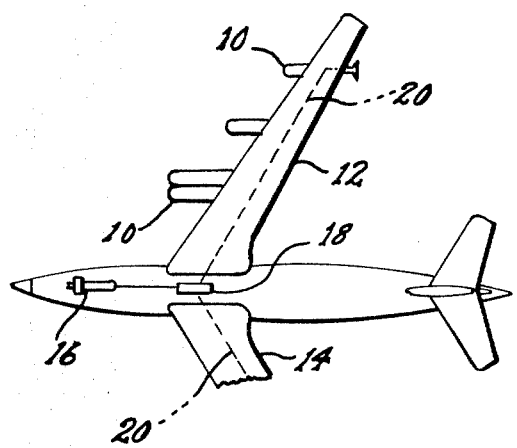
FIG. 1 is a general view of an aircraft having a nucleation agent additive system incorporated in the exhaust system thereof.

The aircraft shown in FIG. 1 includes a plurality of conventionally mounted jet engines 10 which are attached along the lower surfaces of wing members 12 and 14. The contrail suppression means is generally comprised of the control unit 16 located in the aircraft cockpit, the supply and pressurizing unit 18 (shown schematically in FIG. 4), the conduit 20 for transferring the material to the engines 10 and the discharge nozzle ring 22 attached at the aft end of each jet engine 10. The discharge nozzle ring 22 is shown more clearly in FIGS. 2 and 3.

Figure 2:
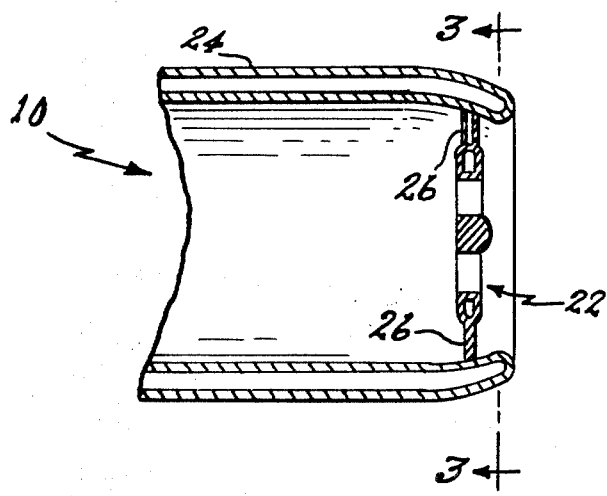
FIG. 2 is a sectional view showing the aft section of a jet aircraft engine with contrail suppressing apparatus according to the present invention attached thereto.
Figure 3:
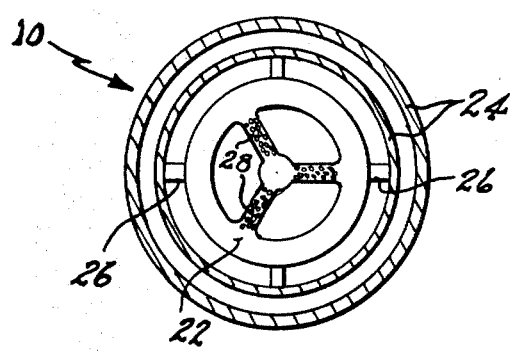
FIG. 3 is an end view along the line 3—3 of FIG. 2 showing the discharge nozzle ring positioned in the exhaust section.

In FIG. 2 there is shown a side view of the aft end of the exhaust section 24 of a jet engine showing the discharge nozzle ring 22. The ring 22 is attached to the inner wall of the exhaust section 24 by the use of supports 26, one of which is hollow to allow passage of a nucleating agent therethrough and into the discharge nozzle ring 22. As shown in FIG. 3 the discharge nozzle ring 22 is provided with a plurality of openings 28 for distributing the nucleating agent into the exhaust stream as it passes through the exhaust section.

A schematic view of one embodiment of the invention is shown in FIG. 4 wherein the nucleating agent consists of chlorosulfonic acid. In this system, a vessel 30 filled with chlorosulfonic acid is pressurized by a cylinder 32 of dry nitrogen gas located in close proximity thereto. The nitrogen cylinder 32 is provided with an electrically operated two stage reducing valve 34 for providing the appropriate pressure to the system. The chlorosulfonic tank 30 is provided with a first manual shut-off 36 at the pressure inlet 38 and a second manual shut-off 40 at the outlet 42. In the outlet line there is installed a motor driven exponential ball valve 44 which includes a potentiometer on the valve handle. A voltmeter 46 connected to the potentiometer on the valve handle and located in the aircraft cockpit shows the degree of opening of the ball valve 44. The outlet line delivers the chlorosulfonic acid nucleating agent to the exhaust sections of each of the aircraft engines 48 through corresponding ball valves 50 having indicating meters 52 located in the cockpit. Since the exhaust sections of the jet engines are normally at elevated temperatures, the chlorosulfonic acid decomposes to form hydrogen chloride and sulfur trioxide.

The following additional valves are included in the system and have the following functions therein: manual shutoff valve 54 to isolate nitrogen container from the system, manual shutoff valve 56 opening to the nitrogen fill line, solenoid operated ball valve 58 which functions as the purge valve for the system, manual shutoff valve 60 used to fill the chlorosulfonic acid tank and manually operated valve 62 which is used to vent the tank during the filling operation.

Before a flight the manually operated valves are adjusted on the ground so that valves 54, 36, and 40 are open, while 56, 60, and 62 are closed.

In operations, the aircraft with the contrail suppression device installed therein is flying at an altitude above 25,000 feet under atmospheric conditions which normally cause water vapor to condense on the particles discharged from the jet engine exhausts. This water vapor takes the form of ice crystals and when sunlight is scattered by these ice crystals, contrails are produced. It has been determined experimentally that if the size of the ice crystals is reduced below half a micron they will not scatter visible light and therefore cannot be seen. The present invention prevents the ice crystals from growing beyond that certain maximum size.

To prevent the formation of contrails, the operator turns switch 64 to the "on" position thereby opening reducing valve 34 which pressurizes the chlorosulfonic acid tank 30. The system is now pressurized to valve 44. The valve 44 is then opened to a predetermined position by turning switch 66 to the "on" position until the needle on meter 46 reaches a predetermined point. Switches 68, controlling the flow of chlorosulfonic acid to the engines, are turned "on" until the needles of meters 52 reach predetermined points corresponding to predetermined openings of valves 50 for required chlorosulfonic acid flow rates. The acid then flows through nozzle rings 22 in the exhaust section of jet engines 48 and is decomposed by the heat from the jet engine exhaust forming hydrogen chloride and sulfur trioxide. The sulfur trioxide being a hygroscopic material takes up water readily and acts to nucleate the trail. Thus, as the sulfur trioxide is dispensed into the exhaust stream through discharge nozzle ring 22, a larger number of smaller ice crystals form which are below the threshold of visibility to the naked eye. It has been determined that, by introducing from 1 to 3 percent sulfur trioxide gas by weight of engine fuel, the combustion vapor trail is rendered substantially invisible.

At the conclusion of the mission, valve 44 is turned to the closed position by means of switch 66 and the solenoid operated ball valve 58 is turned to the open position by switch 70. Nitrogen will thus flow through the section of the system beyond valve 44 and purge it of the remaining chlorosulfonic acid.

Although the invention has been described with reference to a particular embodiment, it will be understood to those skilled in the art that various changes and modifications can be made therein without departing from the invention. For example, other nucleating agents may be utilized for minimizing the ice crystals normally formed in the jet engine exhaust stream.

Therefore, it is intended that all matter contained in the above description and shown in the accompanying drawings shall be interpreted in the illustrative sense, and it is aimed in the appended claims to cover all such changes and modifications without departing from the true spirit and scope of the invention.

What is claimed is:

1. Apparatus for suppressing the condensation trail of a jet aircraft comprising an aircraft having jet engines with exhaust sections in the downstream end thereof, a closed container for holding a supply of chlorosulfonic acid therein, said container having an inlet and an outlet, means communicating with the inlet for pressurizing said container, a conduit having one end attached to the outlet of said container for conducting said chlorosulfonic acid to the exhaust sections of the jet engines of said aircraft, means for controlling the amount of flow of acid through said conduit, and a discharge nozzle ring attached to the other end of said conduit and located at the aft end of the jet engine exhaust section for receiving and injecting the chlorosulfonic acid into the exhaust stream as it passes out of the exhaust section.

2. The apparatus defined in claim 1 wherein the chlorosulfonic acid enclosed in said container is heated prior to injection into the exhaust stream causing said acid to decompose into hydrogen chloride and sulfur trioxide.

References Cited

UNITED STATES PATENTS

| | | | |
|---|---|---|---|
| 2,470,564 | 5/1949 | Laurence et al. | 60—39.14 |
| 2,756,097 | 7/1956 | Brandon et al. | 239—2 |
| 3,109,285 | 11/1963 | Smith | 415—47 |

SAMUEL FEINBERG, Primary Examiner

U.S. Cl. X.R.

60—39.5; 239—2, 265.17